United States Patent
Cuenot et al.

(10) Patent No.: US 7,583,903 B2
(45) Date of Patent: Sep. 1, 2009

(54) DEVICE FOR REGENERATING AN OPTICAL SIGNAL, THE USE OF SUCH A DEVICE, AND AN INSTALLATION INCLUDING SUCH A DEVICE

(75) Inventors: Benjamin Cuenot, Cork (IE); Erwan Pincemin, Gommenec'h (FR)

(73) Assignee: France Telecom, Paris (FR)

( * ) Notice: Subject to any disclaimer, the term of this patent is extended or adjusted under 35 U.S.C. 154(b) by 565 days.

(21) Appl. No.: 11/011,477

(22) Filed: Dec. 13, 2004

(65) Prior Publication Data

US 2005/0158060 A1    Jul. 21, 2005

(30) Foreign Application Priority Data

Dec. 19, 2003    (FR)    ................................ 03 15075

(51) Int. Cl.
*H04B 10/04* (2006.01)
(52) U.S. Cl. ...................................... 398/188; 398/186
(58) Field of Classification Search ................. 398/175, 398/198, 182–201
See application file for complete search history.

(56) References Cited

U.S. PATENT DOCUMENTS

| | | | | |
|---|---|---|---|---|
| 6,822,591 | B2 * | 11/2004 | Kim et al. .................... | 341/137 |
| 6,882,760 | B2 * | 4/2005 | Takabayashi et al. ......... | 385/11 |
| 2003/0002121 | A1 * | 1/2003 | Miyamoto et al. ........... | 359/183 |
| 2003/0058500 | A1 * | 3/2003 | Sugawara .................... | 359/135 |
| 2003/0210912 | A1 | 11/2003 | Leuthold | |
| 2004/0240888 | A1 * | 12/2004 | Leuthold et al. ............ | 398/149 |
| 2005/0095011 | A1 * | 5/2005 | Cottrell et al. .............. | 398/189 |

FOREIGN PATENT DOCUMENTS

EP    1 271 808    1/2003

OTHER PUBLICATIONS

Winzer, Peter; Kim, Hoon. "Degradations in Balanced DPSK Receivers." IEEE Phontonics Technology Letters 15(2003): 1282-1284.*
Hanna M et al, Performance assessment of DPSK soliton transmission system, Electron. Lett. (UK), Electronics Letters, IEE, UK, vol. 37, No. 10, May 10, 2001, pp. 644-646.
Winzer P J et al, Degradations in balanced DPSK receivers, IEEE Photonics Technol. Lett. (USA), IEEEPhotonics Technology Letters, IEEE, USA, vol. 15, No. 9, Sep. 2003, pp. 1282-1284.
Gnauck A H et al, 2.5 Tb/s (64*42.7 Gb/s) transmission over 40*100 km NZDSF using RZ-DPSK format and all-Raman-amplified spans, Wash. D.C., USA, Opt Soc America, USA, 2002, p. FC2-1.
Ryu S et al, Transmission performance improvement in differential phase-shift keying wavelength-division multiplexed transmission systems using all-optical 2R repeaters, Piscataway NJ USA, IEEE 2001, pp. 677-678 vol. 2.

* cited by examiner

*Primary Examiner*—Quan-Zhen Wang
(74) *Attorney, Agent, or Firm*—Oliff & Berridge, PLC

(57) ABSTRACT

The invention relates to a device for regenerating the phase of an optical signal carrying an information encoded by phase modulation of said signal, the device comprising an optical modulation converter for converting the signal carrying the information encoded by phase modulation into at least one secondary signal carrying said information encoded by amplitude modulation, and at least one module for optically regenerating the amplitude of the secondary signal.

6 Claims, 2 Drawing Sheets

DEVICE FOR REGENERATING AN OPTICAL SIGNAL, THE USE OF SUCH A DEVICE, AND AN INSTALLATION INCLUDING SUCH A DEVICE

The present invention relates to a device for regenerating an optical signal, to the use of such a device, and to an installation including such a device.

More precisely, the invention relates to a device for regenerating an optical signal carrying an information encoded by phase modulation of the signal.

BACKGROUND OF THE INVENTION

When a signal is conveyed by an optical fiber, it is subjected to certain kinds of distortion, such as amplitude, frequency, or phase distortion. In order to recover a signal that is as similar as possible to the signal as emitted, it is then necessary to pass the optical signal through a regeneration device.

Devices are already known in the state of the art for regenerating an optical signal carrying information encoded by amplitude modulation of said signal, e.g. by using saturable absorbers.

Unfortunately, in present-day optical transmission devices that enable rates of 40 gigabits per second (Gbits/s) or more to be obtained, ever increasing use is being made of signals that are phase-modulated, in particular by modulation of the differential phase shift keying (DPSK) type. In that type of modulation, information is encoded in the phase of the signal: for example a "1" bit is encoded by inverting the phase of the carrier signal, while a "0" bit is encoded by a lack of phase change.

Present optical regeneration devices do not enable signals carrying information encoded by phase modulation to be regenerated correctly since such devices act only on signal amplitude. Consequently, the phase distortion of signals which degrades the information conveyed thereby cannot be eliminated or at least reduced.

OBJECTS AND SUMMARY OF THE INVENTION

An object of the invention is to remedy that drawback by proposing a signal regeneration device that enables signals that carry information encoded by phase modulation to be regenerated.

To this end, the invention provides a device for regenerating the phase of an optical signal carrying an information encoded by modulating the phase of said signal, the device comprising:

an optical modulation converter for converting the signal carrying the information encoded by phase modulation into at least one secondary signal carrying said information encoded by amplitude modulation; and at least one optical amplitude regeneration module for regenerating the amplitude of the secondary signal.

The regeneration device of the invention thus makes it possible to regenerate the phase of signals carrying information encoded by phase modulation in simple manner by using existing devices for regenerating signals that carry information encoded by amplitude modulation.

A regeneration device of the invention may further comprise one or more of the following characteristics:

the regeneration device further comprises an optical modulation converter for converting the regenerated secondary signal into a signal carrying the information encoded by phase modulation;

the optical converter of phase modulation into amplitude modulation and the optical converter of amplitude modulation into phase modulation are combined as a single reversible converter;

the optical regeneration module for regenerating the secondary signal comprises noise suppressor means;

the noise suppressor means comprise a saturable absorber;

each optical modulation converter comprises two couplers connected in series supplying two secondary signals;

the optical amplitude regeneration module for regenerating the amplitude of the two secondary signals comprises a single saturable absorber simultaneously regenerating the amplitude of both secondary signals; and the optical amplitude regeneration module for regenerating the amplitude of the secondary signals comprises two saturable absorbers respectively regenerating the amplitude of each of the secondary signals.

The invention also provides an optical transmission installation including light signal propagation means, the installation including a regeneration device of the invention as defined above, inserted in the propagation means.

The invention also provides the use of a device combining:

an optical modulation converter for converting a signal carrying an information encoded by phase modulation into at least one secondary signal carrying said information encoded by amplitude modulation; and at least one optical amplitude regeneration module for regenerating the amplitude of the secondary signal, for regenerating the phase of the optical signal carrying the information encoded by phase modulation of the signal.

BRIEF DESCRIPTION OF THE DRAWINGS

The invention will be better understood on reading the following description given purely by way of example and made with reference to the accompanying drawings, in which.

MORE DETAILED DESCRIPTION

Figure 1:
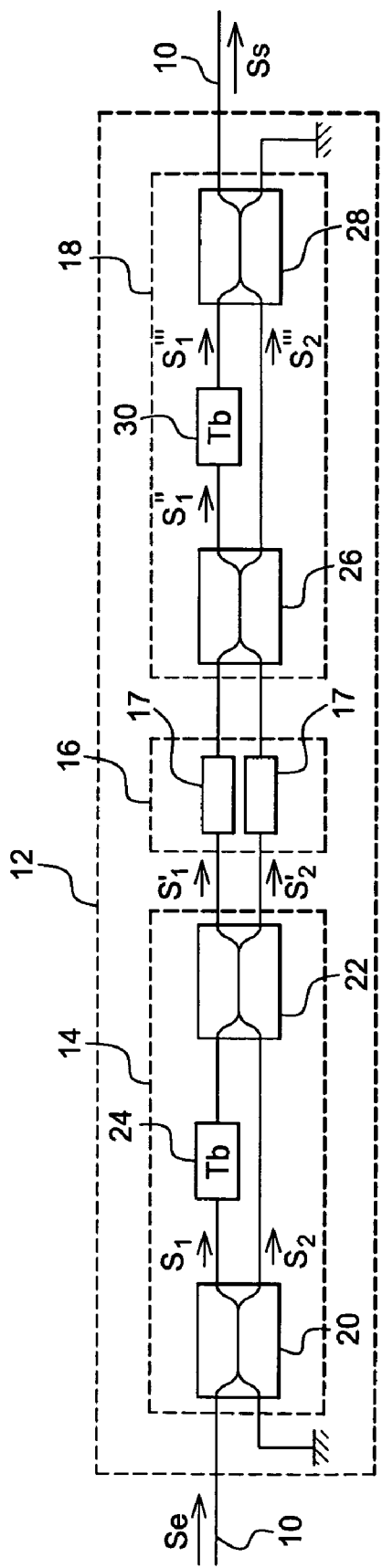
FIG. 1 is a block diagram of a regeneration device in a first embodiment of the invention.

An optical fiber given overall reference 10 is shown in FIG. 1. This optical fiber is used for transmitting a light signal S carrying an information encoded by phase modulation of the signal. The phase modulation used may be selected, for example, from known RZ-DPSK and NRZ-DPSK.

The information carried by the light signal S is binary information. The bits are spaced apart in pairs by a duration $T_b$ referred to as the "bit time".

The signal S(t) is obtained by modulating the phase of a periodic carrier signal P(t) of period $T_p$. The carrier signal is selected in such a manner that $T_b$ is a multiple of $T_p$.

The phase of the signal corresponding to the $n^{th}$ bit transmitted between instants $nT_b$ and $(n+1)T_b$ is written $\phi(n)$.

The signal transmitted over the optical fiber is then written:

$$S(t) = P(t) \cdot e^{i \cdot \phi(n)} \text{ with } n = E\left[\frac{t}{T_b}\right]$$

where E[ ] designates the integer portion function.

An optical signal regeneration device 12 is connected in series with the optical fiber 10. The optical signal entering the regeneration device 12 is written $S_e=S$, and the regenerated optical signal leaving the regeneration device is written $S_S$.

The regeneration device 12 comprises a first optical modulation converter 14 for converting the signal $S_e$ carrying information encoded by phase modulation into two signals $S'_1$ and $S'_2$ carrying said information encoded by amplitude modulation.

These two signals $S'_1$ and $S'_2$ are then regenerated using an optical amplitude regeneration module 16.

The optical signals regenerated in the optical amplitude regeneration module 16 then pass through a second optical modulation converter 18 for converting the signals carrying information encoded by amplitude modulation into a signal $S_S$ carrying the information encoded by phase modulation. The signal $S_S$ thus carries the same information encoded by phase modulation as the signal $S_e$, but it has in the meanwhile been regenerated by the optical amplitude regeneration module 16.

It can be seen that within the regeneration device 12, the signal $S_e$ for regeneration is split into two signals. Reference is then made to the two arms of the regeneration device 12 to refer to the two paths taken by the signals. The signal transmitted over the first arm (top arm in FIG. 1) are given the index 1, whereas the signals conveyed over the second arm (bottom arm) are given the index 2.

Each optical modulation converter 14, 18 is a DPSK demodulator implemented by means of two 3 decibel (dB) couplers 20, 22 for the module 14, and 26 and 28 for the module 18, together with a respective delay element 24 or 30, interposed between the two couplers of the first arm.

A 3 dB coupler is a passive optical quadripole. The two poles via which the signals enter are written $\text{Inlet}_1$ and $\text{Inlet}_2$ and the two poles via which the signals leave are written $\text{Outlet}_1$ and $\text{Outlet}_2$. These poles are then related by the following relationship:

$$\begin{pmatrix} Outlet_1 \\ Outlet_2 \end{pmatrix} = \begin{pmatrix} \alpha & \alpha \cdot e^{i\frac{\pi}{2}} \\ \alpha \cdot e^{i\frac{\pi}{2}} & \alpha \end{pmatrix} \cdot \begin{pmatrix} Inlet_1 \\ Inlet_2 \end{pmatrix} \text{ with } \alpha = \frac{\sqrt{2}}{2}$$

Since a coupler is a passive component, the two inlet poles can be interchangeably the left or the right poles without modifying the above relationship. A 3 dB coupler is said to be "reversible".

The first 3 dB coupler 20 of the optical modulation converter 14 has as its sole input signal the signal $S_e$ entering via the inlet 1. The inlet 2 is connected to ground. The signal obtained at the outlet 1 of the 3 dB coupler 20 is written $S_1$ and the signal obtained at the outlet 2 of the 3 dB coupler 20 is written $S_2$.

These two signals $S_1$ and $S_2$ can then be expressed as follows:

$$S_1(t) = \alpha \cdot S_e(t) = \frac{\sqrt{2}}{2} P(t) \cdot e^{i \cdot \varphi(n)}$$

$$S_2(t) = \alpha \cdot e^{i\frac{\pi}{2}} \cdot S_e(t) = \frac{\sqrt{2}}{2} P(t) \cdot e^{i\left(\varphi(n) + \frac{\pi}{2}\right)}$$

The delay element 24 disposed in the first arm of the optical modulation converter 14 between its two 3 dB couplers 20 and 22 serves to delay the signal $S_1$ by one bit time $T_b$ before it enters into the second 3 dB coupler 22. The delayed signal is then written:

$$S_1(t - T_b) = \alpha \cdot P(t - T_b) \cdot e^{i \cdot \varphi(n')} \text{ where } n' = E\left[\frac{t - T_b}{T_b}\right] = E\left[\frac{t}{T_b} - 1\right] = n - 1$$

The signal $S_2$ obtained on the second arm at the outlet from the first 3 dB coupler 20 enters the second inlet of the second 3 dB coupler 22 directly.

The outlet from the second 3 dB coupler 22 then deliver signals $S_1'$ and $S_2'$ which are written as follows:

$$S_1'(t) = \alpha \cdot \left(S_1(t - T_b) + e^{i\frac{\pi}{2}} \cdot S_2(t)\right) = \frac{1}{2} \cdot P(t) \cdot \left(e^{i \cdot \varphi(n-1)} - e^{i \cdot \varphi(n)}\right)$$

$$S_2'(t) = \alpha \cdot \left(e^{i\frac{\pi}{2}} \cdot S_1(t - T_b) + S_2(t)\right) = \frac{1}{2} \cdot P(t) \cdot \left(e^{i \cdot \varphi(n-1)} + e^{i \cdot \varphi(n)}\right) \cdot e^{i\frac{\pi}{2}}$$

since $T_b$ is a multiple of the period $T_p$ of P, $P(t-T_b)=P(t)$.

The modulation used for encoding information on the carrier signal $S_e$ is two-state differential phase keying. The two states selected for the phase $\phi$ are 0 and $\pi$. Two successive bits are thus encoded by signals of phases that are either equal or opposite.

Consequently, if $\phi(n)=\phi(n-1)$, then the signal $S'_1$ is zero and the signal $S'_2$ is non-zero. Similarly, if $\phi(n)=\phi(n-1)+\pi$, then the signal $S'_1$ is not zero while the signal $S'_2$ is zero. The signals $S'_1$ and $S'_2$ thus carry information that is encoded by amplitude modulation.

The optical amplitude regeneration module 16 of the regeneration device 12 enables these two signals $S'_1$ and $S'_2$ to be regenerated. This module comprises noise suppression means 17. The noise suppression means 17 used are, for example, saturable absorbers that eliminate the noise from the two signals $S'_1$ and $S'_2$ Any other device for regenerating a signal carrying information encoded in amplitude could also be used.

The signal obtained at the outlet from the first arm of the first 3 dB coupler 26 of the second optical modulation converter 18 is written $S''_1$. This signal $S''_1$ is equal to:

$$S_1''(t) = \alpha \cdot S_1'(t) + \alpha \cdot e^{i\frac{\pi}{2}} \cdot S_2'(t) = -\frac{\sqrt{2}}{2} \cdot P(t) \cdot e^{i \cdot \varphi(n)}$$

The signal $S'''_1$ corresponds to the signal $S''_1$ after it has passed through a delay element 30, giving:

$$S_1'''(t) = -\frac{\sqrt{2}}{2} \cdot P(t) \cdot e^{i \cdot \varphi(n-1)}$$

The signal obtained at the outlet from the second arm of the first 3 dB coupler 26 of the second optical modulation converter 18 is written $S'''_2$:

$$S_2'''(t) = \alpha \cdot e^{i\frac{\pi}{2}} \cdot S_1'(t) + \alpha \cdot S_2' = \frac{\sqrt{2}}{2} \cdot P(t) \cdot e^{i \cdot \varphi(n-1)} \cdot e^{i\frac{\pi}{2}}$$

These two signals S'''$_1$ and S'''$_2$ are then inserted into the second 3 dB coupler 28 of the second optical converter 18, having its outlet 2 connected to ground and the signal S$_S$ obtained from the outlet 1 of the second 3 dB coupler 28 then has the value:

$$S_s(t) = \alpha \cdot S_1'''(t) + \alpha \cdot e^{i\frac{\pi}{2}} \cdot S_2'''(t) = -P(t) \cdot e^{i \cdot \varphi(n-1)}$$

It can be seen that the signal S$_S$ corresponds to the signal S$_e$, offset by one bit time, and ignoring sign.

This thus provides a device for regenerating the light signal S carrying information encoded by modulating the phase of said signal. The regeneration device presents the advantage of comprising passive elements only.

Figure 2:
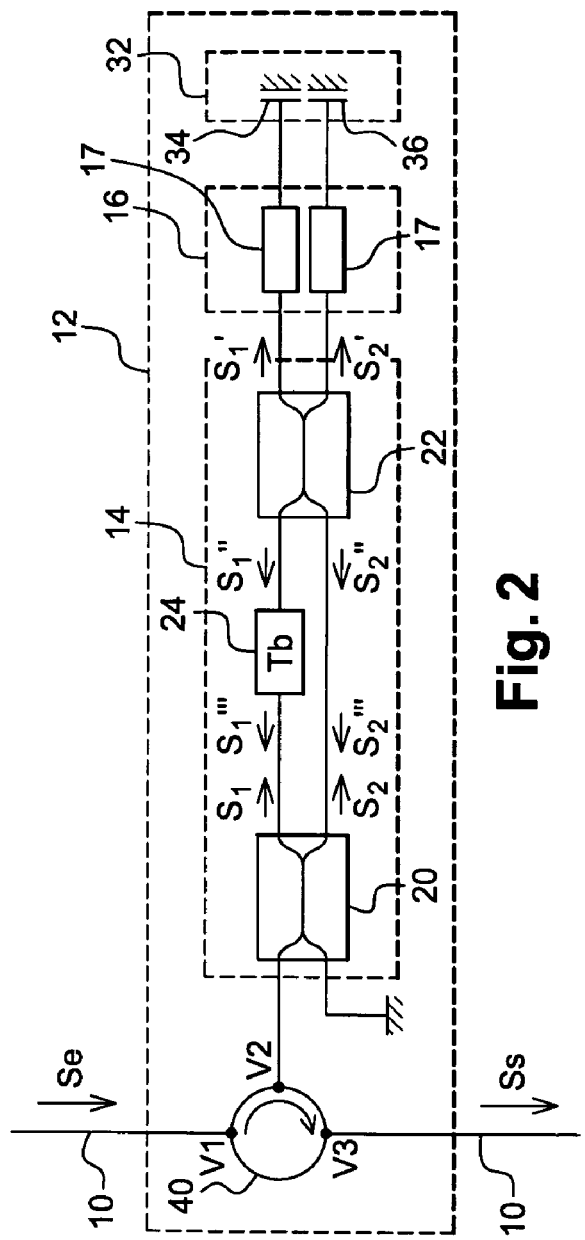
FIG. 2 is a block diagram of a regeneration device in a second embodiment of the invention.

A second embodiment shown in FIG. 2 uses the reversibility property of 3 dB couplers. Since the optical modulation converters 14 and 18 described above are symmetrical devices using reversible components, these optical modulation converters are likewise reversible devices. The same results are obtained regardless of the direction light travels through them.

The term "forward" direction is used for travel from left to right, and the term "reverse" direction is used for travel from right to left.

The regeneration device 12 has a single optical modulation converter 14 connected in series with an optical amplitude regeneration module 16 comprising noise suppressor means 17.

The signals traveling in the forward direction, obtained at the outlet from the optical amplitude regeneration module 16 are identical to those obtained at the outlet from the same module in the first embodiment. A reflector module 32 is disposed at the outlet from the optical outlet regeneration module 16. The reflector module 32 comprises two mirrors 34 and 36 each placed on a respective arm of the regeneration device 12.

It is assumed that the path lengths traveled between the two outlets from the 3 dB coupler 22 and the mirrors 34 and 36 of the reflector device 32 are equal so that the phase difference between the signals is conserved. Otherwise, it is necessary to insert an element that induces a phase difference for adjustment in order to compensate for the phase difference between the two paths.

The signals obtained after reflection on each of the mirrors 34 and 36 of the reflection device 32 are then transmitted in the reverse direction towards the optical modulation converter 14 after passing a second time through the optical amplitude regeneration module 16.

The equations for the signals S$_1$, S'$_1$, S''$_1$, S'''$_1$, S$_2$, S'$_2$, S''$_2$, and S'''$_2$ marked in FIG. 2 are the same as the equations for the embodiment shown in FIG. 1.

In this embodiment, the regeneration device 12 also includes an optical circulator 40 enabling it to be inserted in the middle of the optical fiber 10. The signal S$_e$ traveling along the optical fiber 10 penetrates into the circulator 40 via a first port V$_1$ and leaves via a second port V$_2$ going towards the optical modulation converter 14. After being regenerated, the signal passes back into the optical circulator 40 via the second port V$_2$ and leaves via a third port written V$_3$ in the form of the regenerated outlet signal S$_S$.

Figure 3:
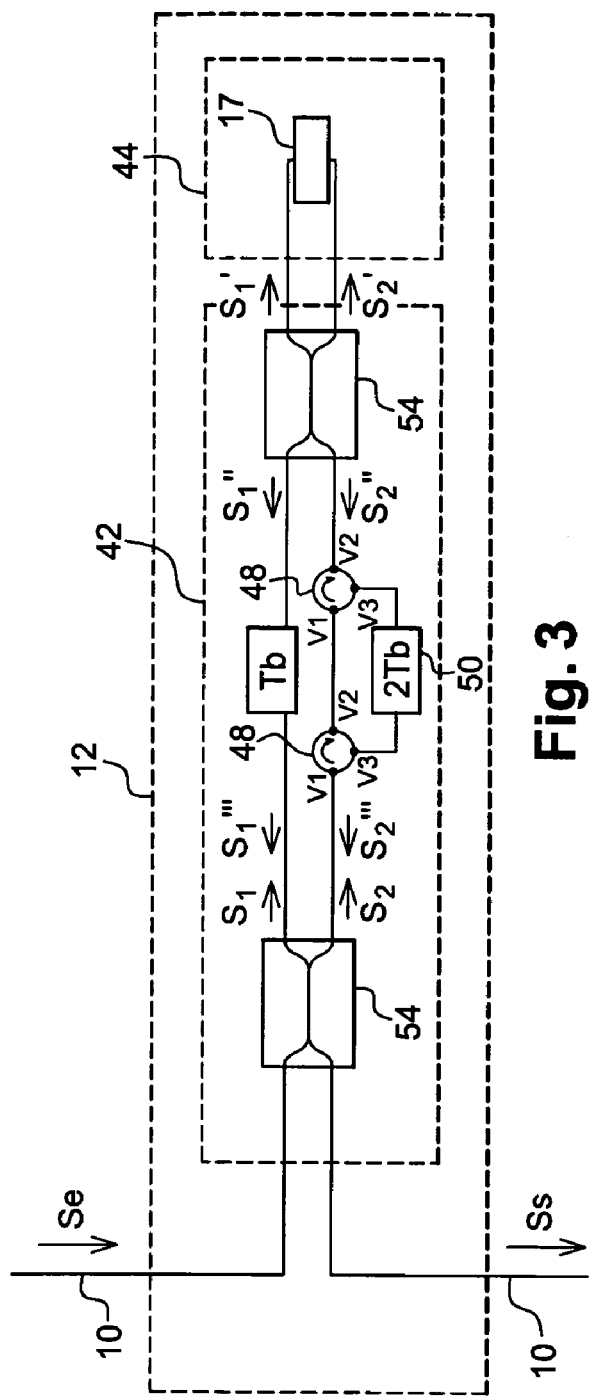
FIG. 3 is a block diagram of a regeneration device in a third embodiment of the invention.

A third embodiment of the invention is shown in FIG. 3. This regeneration device 12 has a single optical modulation converter 42 and an optical amplitude regeneration module 44 comprising noise suppressor means 17 as in the second embodiment.

The optical modulation converter 42 has two 3 dB couplers 54 between which there are placed, on the first arm, a one bit delay element so that the signals traveling in the forward direction are subjected to the same modifications as in the second embodiment.

The optical conversion of the modulation of the signal carrying information encoded by phase modulation into two signals carrying information encoded by amplitude modulation thus takes place in a manner identical to that of the preceding embodiment. The expressions for the signals S$_1$, S'$_1$, S$_2$, and S'$_2$, are unchanged, giving:

$$S_1'(t) = \alpha \cdot \left(S_1(t - T_b) + e^{i\frac{\pi}{2}} \cdot S_2(t)\right) = \frac{1}{2} \cdot P(t) \cdot (e^{i \cdot \varphi(n-1)} - e^{i \cdot \varphi(n)})$$

$$S_2'(t) = \alpha \cdot \left(e^{i\frac{\pi}{2}} \cdot S_1(t - T_b) + S_2(t)\right) = \frac{1}{2} \cdot P(t) \cdot (e^{i \cdot \varphi(n-1)} + e^{i \cdot \varphi(n)}) \cdot e^{i\frac{\pi}{2}}$$

The signals S'$_1$ and S'$_2$ obtained respectively at the outlets from the first and second arms of the optical modulation converter are subsequently transmitted to the optical amplitude regeneration module 44.

Unlike the second embodiment described above, the signal S'$_1$, once regenerated, is reinjected into the optical modulation converter via the inlet on the second arm, and the signal S'$_2$, once regenerated, is reinjected into the optical modulation converter via the inlet in the first arm.

By means of this embodiment, there is no longer any need to use a reflection module. This assumes that the amplitude regenerator module 44 performs its function in both directions and simultaneously. One possible practical embodiment thereof would be a saturable absorber of area that is sufficiently large to enable it to process both signals simultaneously.

While the signals S'$_1$ and S'$_2$ are traveling in the reverse direction through the optical modulation converter 42, the signals obtained at the outlet from the second 3 dB coupler 54 are written as follows:

$$S_1''(t) = \alpha \cdot S_2'(t) + \alpha \cdot e^{i\frac{\pi}{2}} \cdot S_1'(t) = \frac{\sqrt{2}}{2} \cdot P(t) \cdot e^{i\frac{\pi}{2}} \cdot e^{i \cdot \varphi(n-1)}$$

$$S_2''(t) = \alpha \cdot e^{i\frac{\pi}{2}} \cdot S_2'(t) + \alpha \cdot S_1'(t) = -\frac{\sqrt{2}}{2} \cdot P(t) \cdot e^{i \cdot \varphi(n)}$$

After passing through the one bit delay element, the signal S''$_1$ becomes a signal S'''$_1$ having the following expression:

$$S_1'''(t) = \frac{\sqrt{2}}{2} \cdot P(t) \cdot e^{i\frac{\pi}{2}} \cdot e^{i \cdot \varphi(n-2)}$$

To obtain results that are substantially the same as in the second embodiment, a two bit time delay element is placed in the second arm.

This delay element must act only on signals traveling along the second arm in the reverse direction.

For this purpose, two optical circulators 48 are used enabling the signal transmitted along the second arm in the forward direction to remain unchanged, while causing the signals transmitted along the second arm in the reverse direction to pass through the two bit time delay element 50.

After passing through the two bit delay element 50, the signal S''$_2$ becomes the signal S'''$_2$ having the following expression:

$$S_2'''(t) = S_2''(t - 2 \cdot T_b) = -\frac{\sqrt{2}}{2} \cdot P(t) \cdot e^{i \cdot \varphi(n-2)}$$

These two signals S'''₁ and S'''₂ then penetrate into the first 3 dB coupler 54 whose outlet in the second arm in the reverse direction then gives:

$$S_s(t) = \alpha \cdot e^{i\frac{\pi}{2}} \cdot S_1'''(t) + \alpha \cdot S_2'''(t) = -P(t) \cdot e^{i \cdot \varphi(n-2)}$$

It can thus be seen that the signal $S_S$ is equal to the signal $S_e$ offset by two bit times, ignoring sign.

The optical regeneration module 44 that is used in the third embodiment shown in FIG. 3 and that operates simultaneously in both directions can also be made by using two saturable absorbers.

Figure 4:
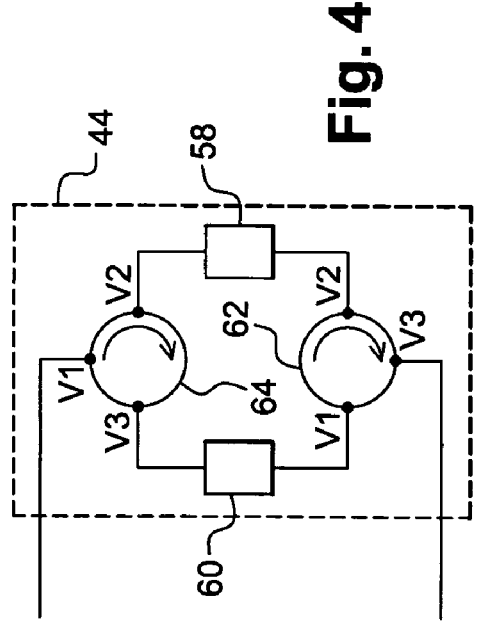
FIG. 4 is a detailed diagram of a variant of a portion of the regeneration device shown in FIG. 3.

This module, shown in greater detail in FIG. 4, has first and second noise suppressor means 58 and 60 and two optical circulators 62 and 64. The noise suppressor means 58 and 60 are constituted, for example, by saturable absorbers. By means of the two optical circulators, the signals traveling from the first arm to the second arm of the optical modulation converter 42 pass through the first saturable absorber 58, while the signals traveling in the opposite direction pass through the second saturable absorber 60.

This optical regeneration device is thus entirely optical and therefore passive. It enables an optical signal carrying information encoded by phase modulation of the signal to be regenerated.

What is claimed is:

1. A device for regenerating the phase of an optical signal carrying an information encoded by modulating the phase of said signal, the device comprising:
    an optical modulation converter for receiving the signal carrying the information encoded by phase modulation from an optical fiber and converting the signal carrying the information encoded by phase modulation into at least one secondary signal carrying said information encoded by amplitude modulation;
    at least one optical amplitude regeneration module for regenerating the amplitude of the secondary signal, the optical regeneration module for regenerating the secondary signal comprising a saturable absorber; and
    an optical modulation converter for converting the regenerated secondary signal into a signal carrying the information encoded by phase modulation and outputting the signal carrying the information encoded by phase modulation to an optical fiber.

2. A regeneration device according to claim 1, in which the optical converter of phase modulation into amplitude modulation and the optical converter of amplitude modulation into phase modulation are combined as a single reversible converter.

3. A regeneration device according to claim 1, in which each optical modulation converter comprises two couplers connected in series supplying two secondary signals.

4. An optical transmission installation comprising an optical fiber, the installation including a regeneration device according to claim 1 in series with the optical fiber.

5. A device for regenerating the phase of an optical signal carrying an information encoded by modulating the phase of said signal, the device comprising:
    an optical modulation converter for receiving the signal carrying the information encoded by phase modulation from an optical fiber and converting the signal carrying the information encoded by phase modulation into at least one secondary signal carrying said information encoded by amplitude modulation;
    at least one optical amplitude regeneration module for regenerating the amplitude of the secondary signal; and
    an optical modulation converter for converting the regenerated secondary signal into a signal carrying the information encoded by phase modulation and outputting the signal carrying the information encoded by phase modulation to an optical fiber;
    wherein each optical modulation converter comprises two couplers connected in series supplying two secondary signals, and the optical amplitude regeneration module for regenerating the amplitude of the two secondary signals comprises a single saturable absorber simultaneously regenerating the amplitude of both secondary signals.

6. A device for regenerating the phase of an optical signal carrying an information encoded by modulating the phase of said signal, the device comprising:
    an optical modulation converter for receiving the signal carrying the information encoded by phase modulation from an optical fiber and converting the signal carrying the information encoded by phase modulation into at least one secondary signal carrying said information encoded by amplitude modulation;
    at least one optical amplitude regeneration module for regenerating the amplitude of the secondary signal; and
    an optical modulation converter for converting the regenerated secondary signal into a signal carrying the information encoded by phase modulation and outputting the signal carrying the information encoded by phase modulation to an optical fiber;
    wherein each optical modulation converter comprises two couplers connected in series supplying two secondary signals, and the optical amplitude regeneration module for regenerating the amplitude of the secondary signals comprises two saturable absorbers respectively regenerating the amplitude of each of the secondary signals.

* * * * *